United States Patent [19]
Stein

[11] 3,778,722

[45] Dec. 11, 1973

[54] RECEIVER FOR DATA SIGNALS, INCLUDING AN AUTOMATIC LINE CORRECTION CIRCUIT

[75] Inventor: Michel Guy Pierre Stein, Yvelines, France

[73] Assignee: Telecommunications Radioelectriques et Telephoniques, Paris, France

[22] Filed: May 11, 1972

[21] Appl. No.: 252,362

[30] Foreign Application Priority Data

May 24, 1971 France .............................. 7118643

[52] U.S. Cl................ 325/414, 178/88, 179/170.8, 325/400, 330/109, 333/28 R

[51] Int. Cl. ............................................ H04l 27/08

[58] Field of Search ........................... 178/69 R, 88; 179/170.8; 325/400, 401, 414; 333/18, 28 R; 307/229, 230, 317; 328/171; 330/109

[56] References Cited

UNITED STATES PATENTS

| | | | |
|---|---|---|---|
| 3,446,996 | 5/1969 | Toffler | 178/69 R X |
| 3,483,335 | 12/1969 | Piotrowski | 179/170.8 X |

FOREIGN PATENTS OR APPLICATIONS

| | | | |
|---|---|---|---|
| 871,783 | 6/1961 | Great Britain | 179/170.8 |

*Primary Examiner*—Felix D. Gruber
*Assistant Examiner*—R. Stephen Dildine, Jr.
*Attorney*—Frank R. Trifari

[57] ABSTRACT

A receiver in a system for baseband data transmission includes a correction circuit for correcting the distortions caused by a transmission line. The correction circuit is provided with a number of correction cells constituted by active highpass filters. An automatic adaptation of the correction circuit to the slope of the line is obtained with the aid of a circuit element having a non-linear current-voltage characteristic without using a separate control circuit.

4 Claims, 5 Drawing Figures

RECEIVER FOR DATA SIGNALS, INCLUDING AN AUTOMATIC LINE CORRECTION CIRCUIT

The invention relates to a receiver for the reception of data signals which are transmitted in the baseband through a transmission line with the aid of a code which does not comprise a direct current component, said receiver being provided with a correction circuit having a number of correction cells for correcting the data signal distortions caused by the transmission line, each correction cell being constituted by an active highpass filter having an operational amplifier whose feedback circuit includes a network having a resistive element and a reactive element.

In a receiver for data signals such a correction circuit is arranged in the path through which the received signal is passed for the purpose of causing the different components of the received signal to undergo an attenuation and a phase shift which as a function of the frequency have a variation which is complementary to that of the attenuation and phase shift introduced by the transmission line so that, for example, a received bivalent data signal after correction, amplification and slicing exhibits transitions which have the same mutual positions as the transmitted bivalent data signal.

It is known that, as a satisfactory approximation, the attenuation-frequency characteristic of a non-pupinized telephone line can be represented by the corresponding characteristic of a lowpass filter which, plotted on a logarithmic scale, has a horizontal asymptote and an oblique asymptote having a positive slope which intersect each other at a point where the attenuation deviates only 3 dB from the actual attenuation. The slope of the oblique asymptote will be referred to hereinafter as the line slope while the value of the slope is expressed, for example, in dB/oct.

The correction circuit which includes, for example, one or more correction cells with an RC-network in the feedback circuit of the operational amplifier, constitutes a highpass filter whose attenuation-frequency characteristic is complementary to that of the line. For the conventional telephone lines and for a frequency region which is limited to the width of the fundamental spectrum of the transmitted data signal, the phase shift introduced by the line is substantially compensated for by the correction circuit.

The line slope depends on the characteristic properties of the line and for given characteristic properties this line slope is a function of the length of the line so that it cannot be avoided that the correction circuit must be adjusted so as to obtain the proper correction of the distortions caused by the line in each installation.

One possibility is to measure the line slope of the line used for each installation and to manufacture or adjust a correction circuit which is adapted to this line. This method which is often used is not practical and poses problems for the mutual exchangeability of the correction circuits. Therefore it is more convenient to use a correction circuit which is automatically adapted to the line slope. The known correction circuits of this type are, however, costly and intricate and employ control circuits with the aid of which one or more elements of the correction circuit are automatically adjusted as a function of the value of the detected received data signal.

An object of the present invention is to provide a receiver of the kind described in the preamble which is provided with a correction circuit automatically adapted to the line slope without employing a control circuit. The correction circuit is very simple in structure and adjustment and includes relatively few components.

According to the invention the receiver is characterized in that each correction cell is a resistive circuit element having a non-linear current-voltage characteristic is connected to the reactive element, the impendance of the combination of the non-linear circuit element and the reactive element being determined substantially by the reactive element in response to low values of the data signal applied to the correction cell and being determined substantially by the non-linear circuit element in response to high values of this data signal.

If the network in the feedback circuit of the operational amplifier in a correction cell consists of a resistor and a capacitor, the non-linear circuit element may have the shape of a pair of anti-parallel arranged diodes shunting the capacitor. As used hereinafter, the term "anti-parallel arranged diodes" is defined as diodes connected in parallel with the anode of each of the diodes connected to the cathode of the other diode.

In the case where the line slope to be corrected is less than 6 dB/oct, the correction circuit needs to include a single correction cell only, while the attenuation curve in the portion varying with the frequency has a maximum of 6 dB/oct.

In order that the invention may be readily carried into effect some embodiments thereof will now be described in detail by way of example with reference to the accompanying diagrammatic drawings in which FIG. 1 shows a receiver according to the invention employing a correction circuit having a single correction cell.

Figure 1:
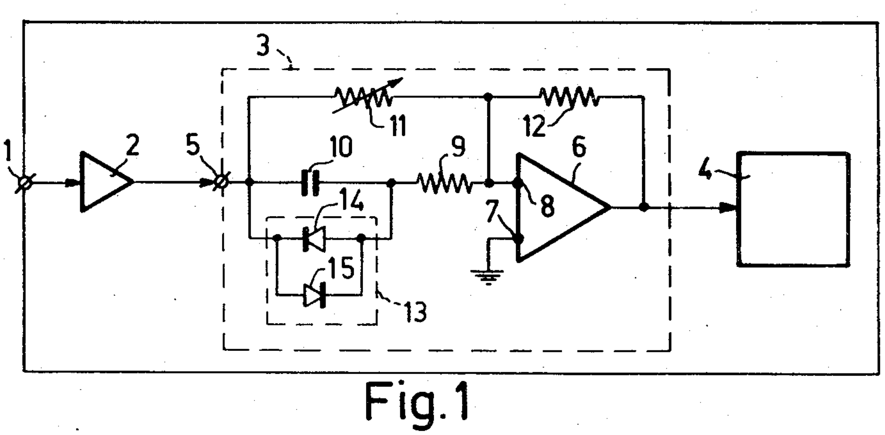

The receiver shown in FIG. 1 is adapted for the reception of binary data signals which are transmitted in the baseband through a telephone line. An input 1 of the receiver is connected to the line and the received data signal is applied to a correction circuit which in FIG. 1 includes an amplifier 2 and a single correction cell. The data signal derived from correction cell 3 is applied to a regeneration circuit 4 and is processed therein in known manner. For the present invention the structure of this regeneration circuit 4 is of little importance and this structure is therefore not further shown in FIG. 1.

The binary data signal is converted in code at the transmitter end before it is applied to the telephone line. In connection with transformers and capacitors possibly incorporated in the line a binary code is used which does not include any spectral components at zero frequency. In the described embodiment, for example, a differential biphase code is used, while the code conversion is explained in FIG. 2.

Figure 2:
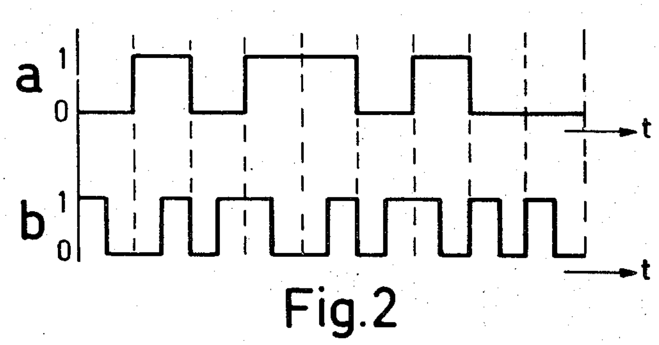
FIG. 2 shows a few time diagrams for the transmission of bivalent data signals by means of a differential biphase code and FIG. 3 shows the associated power spectrum.

It is known that for this code conversion each binary element of the data signal to be coded is converted into a signal including both binary states, namely in the combination of 01 or 10, in which the combination 01 or 10 associated with a given element is determined as a function of the binary value 0 or 1 of this element, taking the combination associated withbthe previous binary element into account. FIG. 2 shows, for example, how a synchronous data signal *a* is converted with the aid of a differential biphase code into the binary signal shown at *b*.

The first binary element "0" of the data signal *a* is converted, for example, into the combination 10. If the next binary element is again 0, the previous combination (thus in this case 10) is repeated. If the next binary element is, however, a "1," the combination is chosen which is opposite to the previous combination (thus in this case 01).

Figure 3:
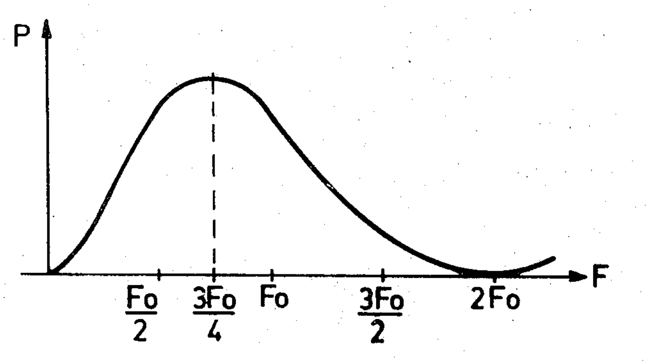

FIG. 3 shows for a differential biphase code the spectral distribution of the power P of the transmitted data signal as a function of the frequency F for the case where the binary elements of the synchronous data signal occur randomly. If the frequency $F_0$ corresponds to the number of binary elements transmitted per second, it is found that the signal energy disappears at the frequencies 0 and $2F_0$ and that it has a maximum at the frequency $3F_0/4$. The transmission line attenuates the different spectrum components of FIG. 3 substantially in accordance with the attenuation frequency characteristic of a lowpass filter which, plotted on a logarithmic scale as regards the part dependent on the frequency, can be represented by a straight line. In the transmission line the slope of this straight line is referred to as line slope while the value of this line slope is dependent on the line type used and on its length.

The correction circuit in the receiver according to FIG. 1 is to be designed in such a manner that the spectral components of the received data signal are given the mutual amplitudes which they had at the transmitter end. In the case of the spectrum of FIG. 3 it is sufficient in practice to accurately perform this correction in the frequency band of between $F_0/4$ and $4F_0/3$ where the major portion of the energy is concentrated.

The correction cell 3 to whose input 5 the data signal to be corrected is applied includes an operational amplifier 6 an input 7 of which is connected to ground and the other input 8 of which is connected to input 5 through an RC-network constituted by a resistor 9 having a value R and a capacitor 10 having a capacitance C. This RC-network is shunted by a resistor 11. Finally, amplifier 6 is provided with negative feedback by means of a resistor 12 having a value $R_1$ which is arranged between the output and the input 8.

Thus the known configuration of an active highpass filter including an RC-network in the feedback circuit is obtained. In the case where the resistor 11 is not included in the circuit the following formula applies which represents the complex value of the attenuation A:

$$A = - R/R_1 \, [1 - j/\omega\tau]$$

in which $\omega$ is the angular frequency corresponding to the frequency F considered and in which $\tau$ is the value of the product RC.

Figure 4:
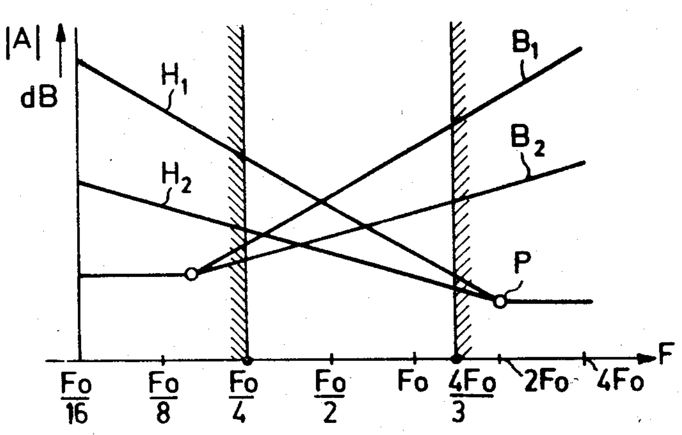
FIG. 4 shows the attenuation curves of the transmission line and the correction circuit.

It is known that in practice the absolute value of the attenuation A as a function of the frequency F can be represented on a logarithmic scale by the two asymptotes. The curve $H_1$ of FIG. 4 represents these two asymptotes for the case where the resistor 11 has an infinite value. The values of the frequencies plotted on the horizontal axis correspond to the above-mentioned case where the data signals are transmitted by means of a differential biphase code at a transmission speed which corresponds to the frequency $F_0$. In that case the frequency band to be corrected by the highpass filter is located between $F_0/4$ and $4F_0/3$. The region where the correction circuit is active is shown in FIG. 4; this region is located between the two vertical lines at the frequencies $F_0/4$ and $4F_0/3$.

Curve $H_1$ shows a horizontal asymptote having an attenuation whose value in dB is determined by the ratio $R/R_1$ and a break point P which corresponds to the frequency F which is determined by the condition $\omega\rho = 2\pi F \cdot \tau = 1$. In the relevant case the point P is located at the frequency $2F_0$ exactly outside the frequency band to be corrected owing to a suitable choice of $\tau$ so that the second asymptote having a slope of 6dB/oct represents, with sufficient accuracy, the attenuation of the filter in the band to be corrected.

Such a highpass filter is suitable to correct the attenuation of a transmission line which in the band to be corrected has a corresponding slope of opposite sign and a value of 6dB/oct.

Curve $B_1$ of FIG. 4 is the asymptotic representation of the attenuation of the lowpass filter which represents the attenuation of the line in a satisfactory approximation. In the frequency band to be corrected the sum of the attenuation of the line and the filter is constant and consequently the relative amplitude of the different components in the spectrum of the corrected signal are the same as those in the spectrum of the transmitted signal.

For the sake of simplicity the slope of the filter or slope of the line is hereinafter to be understood to be the slope of the oblique asymptote which represents the attenuation of the filter of the line.

In the case where the receiver and the correction circuit according to FIG. 1 are set up at the end of a line having a different slope which is represented in FIG. 4 by curve $B_2$ and has a value of, for example, 3 dB/oct (which occurs for a line having the same attenuation per kilometer but at half length the correction cell is to be readjusted so that its slope in the band to be corrected (compare curve $H_2$ of FIG. 4) is likewise 3 dB/oct. If the transmission speed is the same ($F_0$ unchanged) this may be obtained in the embodiment of FIG. 1 by adjusting the value of resistor 11.

If this adjustment is carried out manually, this must be effected for each installation separately taking account of the line used whose slope may vary, for example, between 0 dB/oct. (very short line) and 6 dB/oct. Such an adjustment is difficult and is often effected with little accuracy.

According to the invention a receiver is obtained with a correction circuit which is automatically and continuously adapted to the line slope because in correction cell 3 a resistive circuit element 13 having a non-linear current-voltage characteristic is connected to the reactive element 10, while the impedance of the combination of the non-linear element 13 is determined substantially by the reactive element 10 in case of low values of the data signal applied to correction cell 3 and is determined substantially by the non-linear circuit element 13 at high values of this data signal.

In the receiver shown in FIG. 1 in which the reactive element is constituted by a capacitor 10, the non-linear circuit element 13 consists of a pair of anti-parallel arranged diodes 14 and 15 which shunt capacitor 10.

When the data signal applied to correction cell 3 provides a voltage at input 5 which is lower than the blocking voltage $v_1$ of diodes 14 and 15, these diodes constitute a very high resistance in parallel with capacitor 10 and correction cell 3 then behaves as if these diodes 14, 15 were not present. Correction cell 3 then has the transmission characteristic of a highpass filter which is determined by the resistors 9, 11 and 12 and by the capacitor 10. The slope of the attenuation-frequency characteristic of the highpass filter may be adjusted with the aid of resistor 11 at a given desired value, for example, 3 dB/oct.

When the data signal applied to correction cell 3 provides a voltage at input 5 which is higher than the saturation voltage $v_0$ of diodes 14 and 15, these diodes constitute a very low resistance which substantially short-circuits capacitor 10. The transmission characteristic of correction cell 3 is then substantially determined by resistive elements only and the correction cell behaves as an all-pass filter.

The dB-expressed value of the ratio $v_0/v_1$ is further referred to as N. If the correction circuit is installed at the end of a transmission line which has an average attenuation N dB and a slope of 3 dB/oct in the band to be corrected, and if the voltage at input 5 of correction cell 3 is adjusted in such a manner with the aid of an amplifier 2 having a variable amplification factor that this voltage assumes a value $v_1$, it is obvious that in this case diodes 14, 15 are blocked and correction cell 3 behaves as a highpass filter having a slope of 3 dB/oct. The slope of the transmission line is then compensated for by that of the correction circuit.

When without modifying the amplification of amplifier 2 the correction circuit is installed at the end of a very short transmission line whose average attenuation and slope are substantially equal to zero, the voltage $v_0$ will occur at the input 5 of correction cell 3. Diodes 14 and 15 are highly saturated and correction cell 3 behaves as an all-pass filter having a slope which is equal to zero.

Thus it is found that the same correction circuit which is adjusted with the aid of amplifier 2 for correcting a line having a slope of 3 dB/oct is automatically adapted to correct a line whose slope is equal to zero without using a control circuit for this adaptation.

When the voltage v at input 5 of correction cell 3 increases from the value $v_1$, below which diodes 14 and 15 are blocked, to the value $v_0$ above which diodes 14 and 15 are saturated, a gradual decrease of the slope of correction cell 3 is found to occur from the value 3 dB/oct to the value zero. In this simple manner the surprising result is obtained that the correction circuit of FIG. 1, which as described is adjusted to correct a line having a slope of 3 dB/oct, is not only automatically adapted so as to correct a line having a slope zero but also a line having a slope between zero and 3 dB/oct. In other words if the line for which the correction circuit is adjusted has a length *l* for the slope of 3 dB/oct, the correction circuit is automatically adapted to this line when its length has values of between 0 and 1. In this case no rigorous correction but rather an approximated correction is obtained which, however, yields sufficient results in practice.

It is possible that for a line of a different type the slope of 3 dB/oct does not exactly correspond to an average attenuation in the band of N dB to be corrected, i.e. to the above-mentioned ratio of $v_0/u_1$.

If the correction circuit is used for this different line type, it is sufficient to modify the amplification of amplifier 2 to some extent so that for a slope of 3 dB/oct the voltage $v_1$ appears again at input 5 of correction cell 3. This correction cell 3 will then have a complementary slope of 3 dB/oct which slope decreases with the length of the line. The same type of line, but of a very short length, will have an average attenuation of zero and a slope of zero and the voltage at input 5 of correction cell 3 will be slightly higher or lower than $v_0$, while the slope of the cell may be slightly larger than zero. In practice this is, however, not important because the issue at stake is to obtain an optimum correction for the highest values of the line slopes.

In the embodiment of FIG. 1 a correction cell 3 is used having an RC-network in the feedback circuit of the operational amplifier 6, which correction cell 3 operates as a highpass filter having a variable slope due to the diodes 14 and 15 arranged in parallel with capacitor 10. Circuits or non-linear circuit elements 13 other than diodes may be used.

For example, for an active highpass filter which employs an inductive element as a reactive element in the feedback network of operational amplifier 6, the non-linear circuit element is arranged in series with the inductive element and this non-linear circuit element has a current-voltage characteristic such that for a low current flowing through the inductive element and derived at the end of a long transmission line the said non-linear circuit element constitutes a resistance of very low value which substantially does not exert any influence on the slope of the filter, whereas for a high current flowing through the inductive element and derived at the end of a very short transmission line said non-linear circuit element constitutes a resistance of high value which substantially annihilates the influence of the said inductive element so that the slope of the filter is than substantially equal to zero.

The maximum slope of a correction circuit which includes a single cell and of which FIG. 1 shows an embodiment is 6 dB/oct, which maximum slope is obtained when resistor 11 is not included in the circuit.

In the case when the transmission line whose distortion is to be corrected has a higher slope than 6 dB/oct the correction circuit includes a cascade arrangement of different correction cells having the same structure as correction cell 3 of FIG. 1. The slope of this cascade arrangement is the sum of the slopes of each correction cell and may have a value of more than 6 dB/oct.

Figure 5:
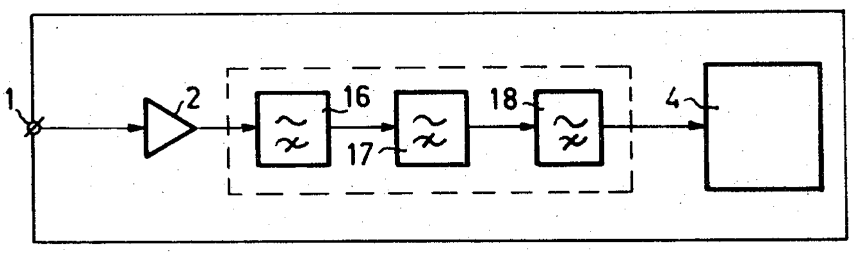
FIG. 5 shows a receiver according to the invention in which the correction circuit is provided with a number of cascade-arranged correction cells.

FIG. 5 diagrammatically shows a receiver according to the invention including a correction circuit which has a cascade arrangement of 3 correction cells. Input 1 of the receiver is connected to a correction circuit including an amplifier 2 having an adjustable amplification factor as well as a cascade arrangement of three correction cells 16, 17 and 18 at whose output the corrected data signal is obtained which is applied to regeneration circuit 4.

Each correction cell 16, 17, 18 is formed, for example, in the same manner as correction cell 3 of FIG. 1 and is adjusted in such a manner that the maximum slope thereof is, for example, 3 dB/oct, which maximum slope is obtained when the influence of diodes 14 and 15 arranged in parallel with capacitor 10 is substantially eliminated. The slope of each correction cell 16, 17, 18 varies between zero and the maximum value of 3 dB/oct when the ratio of the maximum and minimum voltages applied to its input corresponds to N dB.

By correct adjustment of the amplification of amplifier 2 and of the correction cells 16, 17, 18 that the correction circuit of FIG. 5 is automatically adapted to correct a line having a slope of between 0 and 9 dB/oct.

The adjustment is effected as follows: A voltage having the spectrum of the transmitted data signal and having successively increasing levels: $v$ dB, $(v + N)$ dB, $(v + 2N)$ dB, $(v + 3N)$dB is applied to input 1 of the receiver of FIG. 5. Amplifier 2 and correction cells 16, 17, 18 are then adjusted as follows: for a voltage having a level of $v$ dB of the diodes of all correction cells 16, 17, 18 are blocked, but those of correction cell 18 are at the blocking limit; the slope of the three correction cells combined is then 9 dB/oct.

For a voltage having a level of $(v + N)$ dB the diodes of correction cell 18 are completely saturated and are thus entirely conducting, those of correction cell 17 are at the blocking limit and those of cell 16 remain unambiguously blocked; the slope of the three correction cells combined is 6 dB/oct.

For a voltage having a level of $(v + 2N)$ dB the diodes of correction cells 18 and 17 are entirely conducting, those of correction cell 16 are at the blocking limit; the slope of the three correction cells combined is 3 dB/oct.

For a voltage having a level of $(v + 3N)$dB, the diodes of all correction cells 16, 17, 18 are entirely conducting and the three correction cells combined behave as an all-pass filter having a slope of 0 dB/oct.

If the correction circuit thus adjusted is successively installed in a receiver at the end of transmission lines having slopes of 9, 6, 3 and 0 dB/oct, respectively, and average attenuations of 3N, 2N, N and 0 dB, respectively, associated with these slopes which give voltages having levels of $v$, $(v + N)$, $(v + 2N)$, $(v + 3N)$ dB, respectively, at the input of the receiver, it is found that the slope of the cascade arrangement of three correction cells 16, 17, 18 is in each case complementary to that of the transmission line. In other words, for this line type which at a length of 3 $l$ has an average attenuation of 3N dB and a slope of 9 dB/oct the correction circuit is automatically adapted for correcting lines having a length of 3 $l$, 2 $l$, $l$ and 0 whose slopes are 9, 6, 3 and 0 dB/oct, respectively.

Likewise as in the correction circuit of FIG. 1 using a single correction cell, it has been found for the correction circuit of FIG. 5 employing three correction cells that it is automatically adapted with sufficient accuracy in practice, not only to lines having slopes which vary by steps of 3 dB/oct but also to lines which have any slope lying between 0 and 9 dB/oct.

Finally it is to be noted that in the case where the correction is not considered to be sufficiently accurate, it is always possible to slightly modify the slope of the correction circuit by continuous control of the amplification of amplifier 2. This results in the important advantage of the correction circuit that the correction can thus be made optimum by a single and very simple control.

What is claimed is:

1. A receiver for data signals transmitted in the baseband through a transmission line with the aid of a code which does not comprise any direct current component, the receiver comprising: a plurality of correction cells for compensating for data signal distortions caused by the transmission line; each correction cell comprising an operational amplifier, and a feedback network; each feedback network comprising a reactive element, and a resistive means having a non-linear current-voltage characteristic connected thereto for providing in combination with the reactive element a substantially resistive impedance in the feedback network in response to received data signals in a first voltage range and for providing in combination with the reactive element a substantially reactive impedance in the feedback network in response to received data signals in a second voltage range, the second voltage range being a higher range than that of the first voltage range.

2. A receiver as claimed in claim 1, wherein the feedback network comprises a capacitor as a reactive element, and wherein the non-linear circuit element comprises a pair of anti-parallel arranged diodes connected in parallel with the capacitor.

3. A receiver as claimed in claim 1, further comprising an amplifier preceding the correction cells and having an adjustable amplification factor for adjusting the value of the data signal applied to the correction cells.

4. A receiver as claimed in claim 1, wherein each correction cell further comprises a variable resistor in the feedback circuit for adjusting the slope of the attenuation-frequency characteristic of said correction cell to a prescribed value.

* * * * *

PO-1050
(5/69)

UNITED STATES PATENT OFFICE
CERTIFICATE OF CORRECTION

Patent No. 3,778,722 Dated December 11, 1973

Inventor(s) MICHEL GUY PIERRE STEIN

It is certified that error appears in the above-identified patent and that said Letters Patent are hereby corrected as shown below:

IN THE SPECIFICATION

Col. 2, line 7, after "that" insert --in--; after "cell" cancel "is"

Col. 3, line 11, " 0 " should be --"0"--;

line 63, " A " should be -- $|A|$ --;

Col. 4, line 13, "$\rho$" should be -- $\tau$ --;

line 61, after "non-linear" insert --circuit--;

Col. 5, line 60, after "length" "$\ell$" should be --1--;

Col. 6, line 2, "$v_o/u_1$" should be --$v_o/v_1$--;

Col. 7, line 5, cancel "that";

line 43, "$\ell$" should be --1--;

Signed and sealed this 25th day of June 1974.

(SEAL)
Attest:

DWARD M. FLETCHER, JR.
ttesting Officer

C. MARSHALL DANN
Commissioner of Patents